US007054983B2

(12) United States Patent
Mizokuchi et al.

(10) Patent No.: US 7,054,983 B2
(45) Date of Patent: May 30, 2006

(54) USB-HUB DEVICE AND ITS CONTROL METHOD

(75) Inventors: Makoto Mizokuchi, Kanagawa (JP); Masataka Yakashiro, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 367 days.

(21) Appl. No.: 10/301,240

(22) Filed: Nov. 21, 2002

(65) Prior Publication Data
US 2003/0097512 A1 May 22, 2003

(30) Foreign Application Priority Data
Nov. 21, 2001 (JP) ............................. 2001-355781

(51) Int. Cl.
*G06F 13/14* (2006.01)
*G06F 13/36* (2006.01)
*G06F 13/20* (2006.01)

(52) U.S. Cl. .................... 710/305; 710/306; 710/313; 710/314

(58) Field of Classification Search ......... 710/305–315
See application file for complete search history.

(56) References Cited

U.S. PATENT DOCUMENTS

| 5,974,486 | A | * | 10/1999 | Siddappa | 710/53 |
|---|---|---|---|---|---|
| 5,987,617 | A | * | 11/1999 | Hu et al. | 713/320 |
| 6,185,641 | B1 | * | 2/2001 | Dunnihoo | 710/56 |
| 6,202,117 | B1 | * | 3/2001 | Gates | 710/315 |
| 6,205,501 | B1 | * | 3/2001 | Brief et al. | 710/100 |
| 6,219,736 | B1 | * | 4/2001 | Klingman | 710/315 |
| 6,230,226 | B1 | * | 5/2001 | Hu et al. | 710/305 |
| 6,718,423 | B1 | * | 4/2004 | Zolnowsky | 710/313 |
| 2001/0014925 | A1 | * | 8/2001 | Kumata | 710/101 |
| 2003/0093607 | A1 | * | 5/2003 | Main et al. | 710/306 |

FOREIGN PATENT DOCUMENTS

| JP | 11-112524 | 4/1999 |
|---|---|---|
| JP | 11-122280 | 4/1999 |

OTHER PUBLICATIONS

"Universal Serial Bus Specification," Sep. 23, 1998, Rev. 1.1, p. 212.*

(Continued)

*Primary Examiner*—Rehana Perveen
*Assistant Examiner*—Faisal Zaman
(74) *Attorney, Agent, or Firm*—Darryl G. Walker; Bradley T. Sako (57) ABSTRACT

A USB-HUB device in which a request for a device connected to a port of the USB-HUB device may be executed by commonly using a serial interface engine of the HUB device has been disclosed. A USB-HUB device (1) may include a HUB address register (124), a HID address register (125), a first comparator (123), a second comparator (113), a virtual port control unit (18) and a HID request processing unit (131). A HID address register (125) may store a HID address. A first comparator (123) may compare a value of a HUB address register (124) with an address field of a supplied token packet. A second comparator (113) may compare a value of a HID address register (125) with an address field of the supplied token packet. A virtual port control unit (18) may indicate a status of a port to which a device (3) may be virtually connected. A HID processing unit (131) may perform a process in response to a request for the device (3).

19 Claims, 6 Drawing Sheets

OTHER PUBLICATIONS

Clee, James, "Version 2.0 Expands USB Bandwidth," Sep. 18, 2000, Electronic Engineering Times, p. 98, 101, and 114.*

Manafy, Michelle, "USB 2.0 Fires Up a Familiar Interface," Nov. 2001, Emedia Magazine, p. 11-14.*

Fleming, William A., "USB 2.0," Oct. 2002, Inside NetWare, p. 6.*

Fyffe, Steven, "The Historic Battle of 1394," Jul. 23, 2001, Electronic News, p. 24.*

Japanese Office Action of Dec. 9, 2003.

English Translations of the indicated portions of the above-referenced Office Action.

USB Hardware & Software (Japanese Version), Chapter 6—Packet and Transaction, pp. 161-192, and Chapter 8—Data Transfer, pp. 199-242, written by John Garney, Ed Solari, Shelagh Callahan, Kosar Jaff, and Brad Hoslar and published Sep. 8, 1999, by Annabooks.

* cited by examiner

USB-HUB DEVICE AND ITS CONTROL METHOD

TECHNICAL FIELD

The present invention relates generally to an HUB device used for a universal serial bus (USB) and more particularly to USB-HUB device having a control circuit that may commonly use a serial interface engine in the HUB device and its control method.

BACKGROUND OF THE INVENTION

Universal serial bus (USB) is a standard serial-communication interface for connecting a host computer (hereinafter, referred to as a host) to devices such as a printer, scanner, digital camera, large-capacity memory, and/or human interface devices (HIDs) including a keyboard, touch panel, track ball, and mouse, as just a few examples.

A USB-HUB device (hereinafter referred to as a HUB) having a single up port and a plurality of down ports is used to connect the plurality of devices having the above-mentioned USB to the host.

Figure 6:
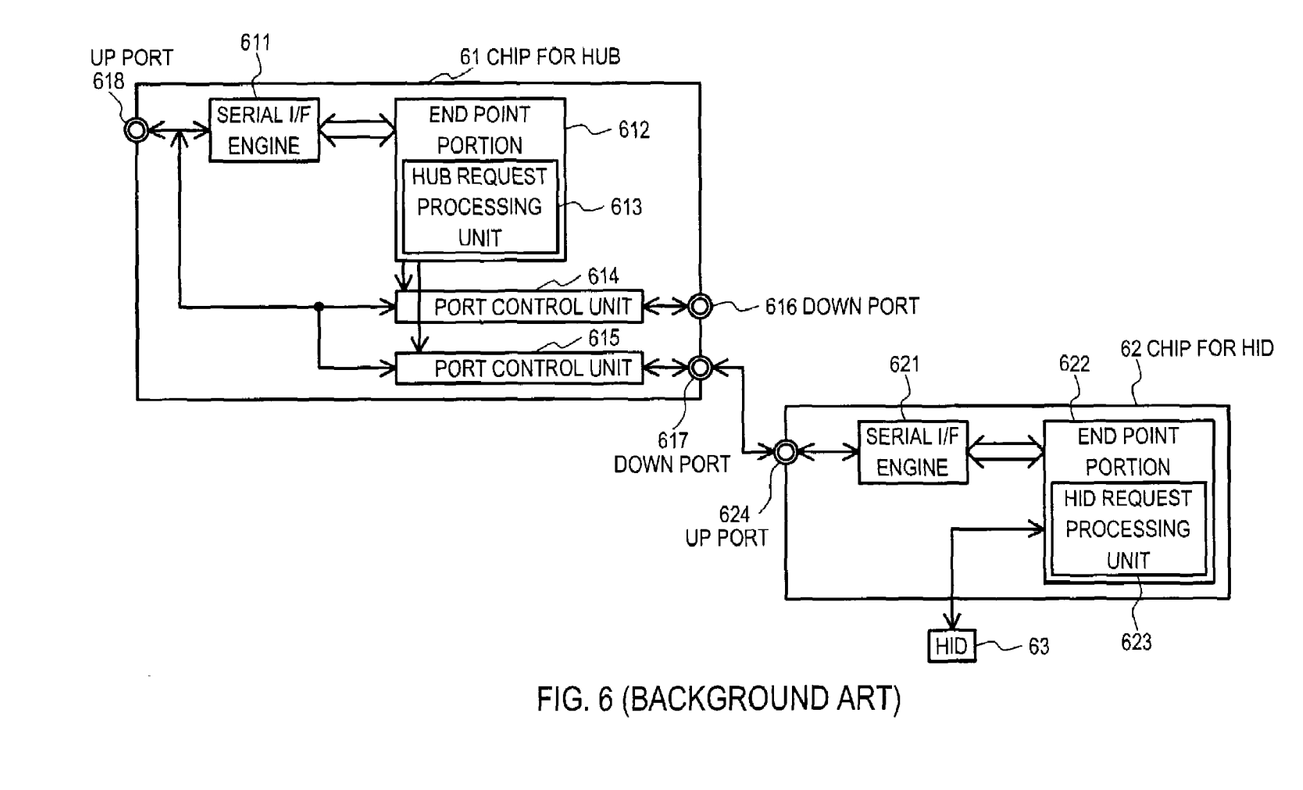
FIG. 6 is a block schematic diagram of a chip for HUB and a chip for HID.

Referring now to FIG. 6, a block schematic diagram of a chip for HUB 61 and a chip for HID 62 is set forth.

A chip for HUB 61 includes an up port 618, a serial interface engine (SIE) 611, an end point (EP) portion 612, an HUB request processing unit 613, port control units (614 and 615) and down ports (616 and 617). Up port 618 can be for connecting devices to the host. An HUB request processing unit 613 performs a process of the HUB. The number of port control units (614 and 615) corresponds to the number of down ports (616 and 617).

Devices are connected to the host via the chip for HUB 61 by connecting the devices to the plurality of down ports (616 and 617). In the example of FIG. 6, an HID 63 is illustrated as the above-mentioned device connected to down port 617. In this example, no device is connected to down port 616.

Conventionally, a chip for HID 62 is required to be connected between the chip for HUB 61 and HID 63. A chip for HID 62 has an up port 624, a serial interface engine (SIE) 621, an end point portion 622, and a HID request processing unit 623. Up port 624 is connected to the down port 617 of the chip for HUB 61. HID request processing unit 623 performs a process of the HID 63.

As mentioned above, when a conventional USB interface is used, the connection betwer devices (e.g., HIDs) and a down ports for a HUB can include an SIE situated between to the HID request processing unit and such down ports. Because an HUB function and device functions are collected at the same address, addresses need to be given individually for the device functions. Accordingly, an SIE for identifying the address for each device function needs to be provided. Thus, as a number of HUB ports increases, circuit scale can increase. Therefore, chip size and manufacturing costs can increase.

In view of the above discussion, it would be desirable to provide a structure in which a serial interface unit (SIE) for a HUB is commonly used, so that a host may recognize a device using an SIE of a HUB.

SUMMARY OF THE INVENTION

According to the present embodiments, A USB-HUB device in which a request for a device connected to a port of a HUB device may be executed by commonly using a serial interface engine of the HUB device is disclosed. A USB-HUB device may include a HUB address register, a HID address register, a first comparator, a second comparator, a virtual port control unit, and a HID request processing unit. A HID address register may store a HID address. A first comparator may compare a value of a HUB address register with an address field of a supplied token packet. A second comparator may compare a value of a HID address register with an address field of the supplied token packet. A virtual port control unit may indicate a status of a port to which a device may be virtually connected. A HID processing unit may perform a process in response to a request for the device.

According to one aspect of the embodiments, a USB-HUB device may include an up port and a down port. An USB-HUB device may include a serial interface engine and an end point portion. The serial interface engine may transfer a transaction provided to the up port in response to a control signal. The end point portion may compare a HUB address with an address field of a token packet of the transaction provided to the up port and may compare a device address with the address field of the token packet. If the address field coincides with either the HUB address or the device address, the end point portion may provide the control signal and receive the transaction from the serial interface engine.

According to another aspect of the embodiments, an USB-HUB device may include a HUB request processing unit and a device request processing unit. A HUB request processing unit may perform predetermined HUB functions of the USB-HUB device in accordance with at least one HUB request signal. A device request processing unit may generate at least one HUB request signal when the transaction indicates a control transfer of a HUB device function.

According to another aspect of the embodiments, an USB-HUB device may include a port control unit and a virtual port control unit. A port control unit may connect an external device to at least one up port via the at least one down port. A virtual port control unit may connect the device to the at least one up port via a data pat that does not include a down port.

According to another aspect of the embodiments, an USB-HUB device may include a device request processing unit that executes predetermined device functions in response to the virtual port control unit and at least a portion of a data packet of a transaction.

According to another aspect of the embodiments, an USB-HUB device may include a HUB address register and a device address register. A HUB address register may store an address for HUB functions of the USB-HUB device. A device address register may store an address of a device connected not via the down port.

According to another aspect of the embodiments, the USB-HUB device may include a HUB request processing unit and a device request processing unit. A HUB request processing unit may set the HUB address of the HUB address register to a set address value when a data packet of a transaction includes an address setting request of for the USB-HUB device. A device request processing unit may set the device address of the device address register when the data packet of the transaction is an address setting request for the device.

According to another aspect of the embodiments, a USB HUB device may include a serial interface engine, a down port, a port control unit, a virtual port control unit, a HUB address register, a device address register, a comparator, a HUB request processing unit, a device request processing unit, and a control block. A serial interface engine may receive a transaction from a host computer coupled to an up port and may transfer the transaction in response to a control signal. The port control unit may be provided for the down port. A virtual port control unit may be provided for a device connected not via the down port. A HUB address register may store a HUB address. A device address register may store a device address of the device. A comparator may compare the HUB address and the device address with an address field of a token packet of the transaction and may provide the control signal if the HUB address or the device address matches the address field. A HUB request processing unit may set the HUB address register, the port control unit, or the virtual port control unit in response to a first request signal. A device request processing unit may set the device address register in response to a second request signal. A control block may transfer a data packet of the transaction when the transaction transferred in response to the control signal is received and the transaction indicates a control transfer. The control block may transfer data in accordance with the token packet of the transaction when the transaction indicates an interrupt transfer.

According to another aspect of the embodiments, a comparator may provide a coincident signal if the HUB address or the device address matches the address field and the control signal may be provided in response to the coincident signal.

According to another aspect of the embodiments, the comparator may include a first comparator and a second comparator. The first comparator may receive the HUB address from the HUB address register and the address field and may provide a first coincident signal if the HUB address matches the address field. The second comparator may receive the device address from the device address register and the address field and may provide a second coincident signal if the device address matches the address field. The control signal may be provided in response to the first coincident signal or the second coincident signal.

According to another aspect of the embodiments, the serial interface engine may include a control block. The control block may receive the control signal and the transaction from the host computer and may transfer the transaction in response to the control signal.

According to another aspect of the embodiments, the serial interface engine may include a serial/parallel converting unit. The serial/parallel converting unit may serially receive at least a portion of the transaction from the host computer and provide parallel data as the address field.

According to another aspect of the embodiments, the serial interface engine may include an address latch. The address latch may receive and latch an address field provided from a serial/parallel converting unit.

According to another aspect of the embodiments, a control method of a USB-HUB device may include the steps of latching an address field of a token packet of a transaction provided from a host, comparing a value of a HUB address register with the address field, setting an intra-office address to a value of a HUB address when the step of comparing the value of the HUB address register with the address field determines a coincidence, setting the intra-office address to a value of a device address when the step of comparing the value of the HUB address register with the address field determines a non-coincidence, comparing the intra-office address with the address field, determining whether the transaction indicates a first transfer type or a second transfer type when the step of comparing the intra-office address with the address field determines a coincidence, transferring a data packet of the transaction when determining the first transfer type, and executing a process based on the transaction when determining the second transfer type.

According to another aspect of the embodiments, the control method of a USB-HUB device may include the steps of decoding a request from the transferred data packet, performing a process of a HUB request when the value of the HUB address register coincides with the address field, and performing a process of a device request when the value of the device address register coincides with the address field and an enable signal is set by a virtual port control unit.

According to another aspect of the embodiments, a step of setting an intra-office address to a value of a device address may include providing the intra-office address as the device address through a selection circuit.

According to another aspect of the embodiments, a step of setting an intra-office address to a value of a HUB address may include providing the intra-office address as the HUB address through a selection circuit.

According to another aspect of the embodiments, a control method of a USB-HUB device may include the steps of latching an address field of a token packet of a transaction provided from a host, comparing a value of a HUB address register and a device address register with the address field, determining whether the transaction indicates a first transfer type or a second transfer type when the step of comparing the value of the HUB address register with the address field determines a coincidence or comparing the value of the device address register with the address field determines a coincidence, transferring a data packet of the transaction when determining the first transfer type, and executing a process based on the transaction when determining the second transfer type.

According to another aspect of the embodiments, a control method of a USB-HUB device may include the steps of decoding a request from the transferred data packet, performing a process of a HUB request when the value of the HUB address register coincides with the address field, and performing a process of a device request when the value of the device address register coincides with the address field and an enable signal is set by a virtual port control unit.

According to another aspect of the embodiments, a control method of a USB-HUB device including an up port connected to a host, a port control unit for connecting a device via a down port, and a virtual port control unit for connecting the device not via the down port may include the steps of setting a HUB address by a control transfer first transaction provided from the host, setting an enable signal to the virtual port control unit by a control transfer second transaction provided from the host, setting a device address in the USB-HUB device by a control transfer third transaction provided from the host and an enable signal from the virtual port control unit, and reading or writing information of the device specified by the device address by interrupt transfer provided from the host.

According to another aspect of the embodiments, a step of reading or writing information from the device may include comparing an address value included with a token packet of the interrupt transfer with a value stored in a HUB address register and comparing the address value included with the token packet with a value stored in a device address register.

DETAILED DESCRIPTION OF THE EMBODIMENTS

According to embodiments, a universal serial bus (USB) device may include a serial interface engine (SIE), an end point portion, a device request processing unit, an HUB request processing unit, and a port control unit. The SIE may be connected to an up port from which transactions may be received. An end point portion may have an HUB address register for storing an HUB address and a device register for storing a device address. A device request processing unit may perform device related functions according to device requests included in a data packet of the transaction. An HUB processing unit may perform HUB related functions according to HUB requests included in a data packet of the transaction. An SIE may be utilized for HUB related functions or device related functions.

Various embodiments of the present invention will now be described in detail with reference to a number of drawings.

A description is given assuming that an USB-HUB of the present embodiments may be realized in a human interface device (HID). For example, an USB-HUB may be implemented as, or included as part of a microcomputer for a keyboard. Such a microcomputer may take the form of a chip. Further, it is assumed that an HID is connected to the microcomputer.

Figure 1:
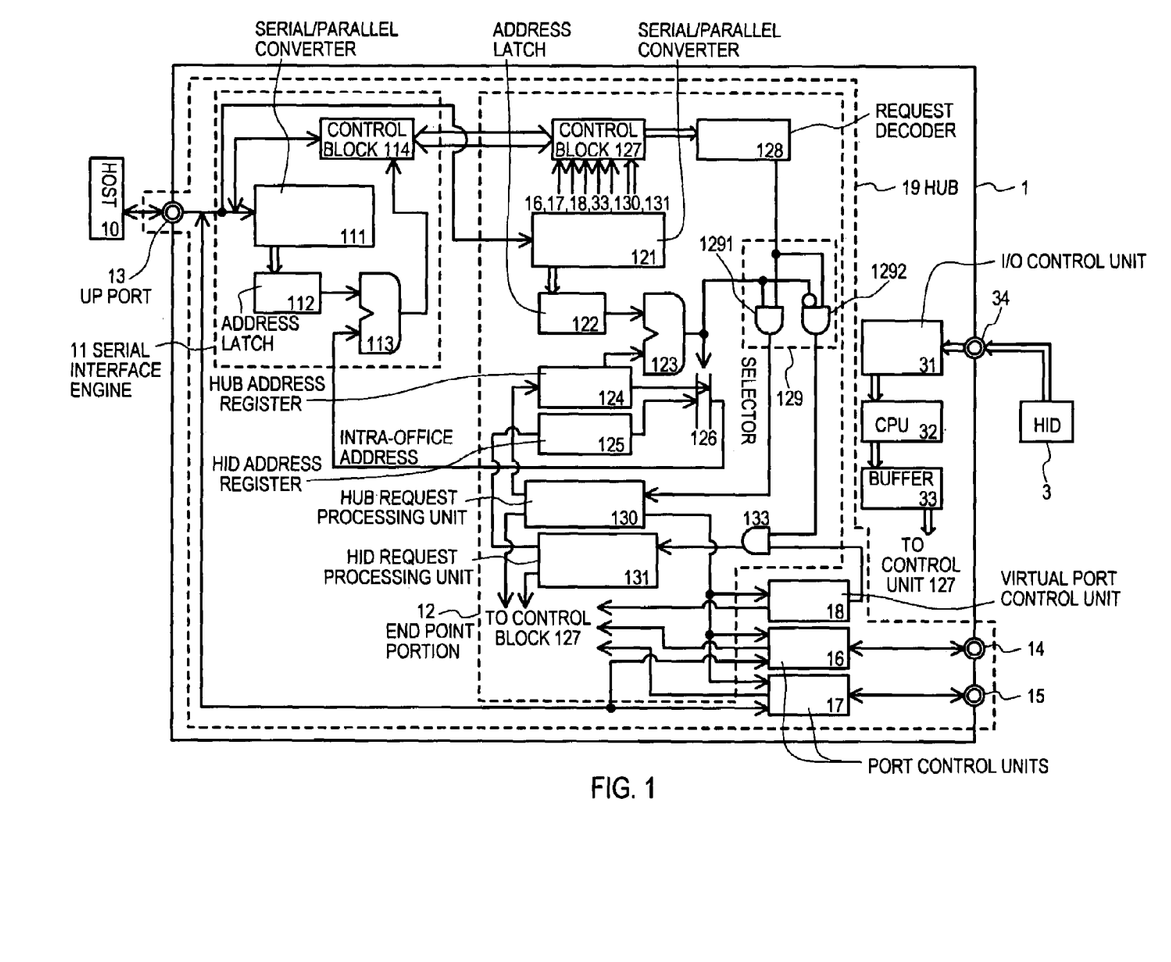
FIG. 1 is a block schematic diagram of a microcomputer, a host, and a HID according to an embodiment.

Referring now to FIG. 1, a block schematic diagram of a microcomputer 1, a host 10, and a HID 3 according to an embodiment is set forth.

A microcomputer 1 may include a HUB 19, an external terminal 34, an I/O control unit 31, a central processing unit (CPU) 32, and a buffer 33. Data from HID 3 may be provided to external terminal 34. CPU 32 may be connected to I/O control unit 31. Buffer 33 may be connected to CPU 32. It is assumed here that CPU 32 may receive data from an HID 3 via external terminal 34 and I/O control unit 31 and may periodically write the data to buffer 33.

HUB 19 may include an up port 13, a serial interface engine (SIE) 11, an end point (EP) portion 12, port control units (16 and 17), a virtual port control unit 18, and down ports (14 and 15). Up port 13 may provide a connection between HUB 19 and a host 10. Down ports (14 and 15) may provide connections to other devices. Down ports may (14 and 15) correspond to port control units 16 and 17, respectively.

A host 10 may execute requests for HUB 19 and/or the device (HID 3) according to transactions provided via up port 13.

A transaction may include a token packet and, optionally, a data packet. A transaction token packet may include address values for specifying a HUB 19 and/or device 3 in an address field. A transaction data packet may include requests for a HUB 19 and/or device 3. Transactions may include various types transfer types, including the following four: bulk transfer, interrupt transfer, isochronous transfer, and control transfer. A detailed description of these transfer types and the transaction is set forth in *USB Hardware & Software* (Japanese Version), Chapter 6—Packet and Transaction, pp. 161–192, and Chapter 8—Data Transfer, pp 199–242, written by John Garney, Ed Solari, Shelagh Callahan, Kosar Jaff, and Brad Hoslar and published Sep. 8, 1999.

SIE 11 may include a serial/parallel converting unit 111, an address latch 112, a comparator 113, and a control block 114. Serial/parallel converting unit 111 may be connected to up port 13 and may convert the received transaction to parallel data. Address latch 112 may latch an address field of a token packet provided from serial/parallel converting unit 111. Comparator 113 may compare a value of address latch 112 with an intra-office address provided from EP portion 12. Control block 114 may be connected to up port 13 and may control the transfer of the transaction by the output of comparator 113.

EP portion 12 may include a serial/parallel converter 121, an address latch 122, a comparator 123, a HUB address register 124, a HID address register 125, a selector 126, a control block 127, a request decoder 128, a selecting gate 129, a HUB request processing unit 130, a HID request processing unit 131, and an AND gate 133. Serial/parallel converter 121 may be connected to up port 13. Address latch 122 may latch an address field of a token packet provided from serial/parallel converter 121. Comparator 123 may compare a value of address latch 122 with a HUB address stored in HUB address register 124. HID address register 125 may store an HID address. Selector 126 may switch a value of an HUB address register 124 and a value of HID address register 125 in response to the output of comparator 123. Selector 126 may output the switched value as an intra-office address.

Control block 127 may transmit a data packet of a transaction to a request decoder when a transaction supplied from control block 114 indicates a control transfer. Request decoder 128 may decode the data packet provided from control block 127. Selecting gate 129 may include AND gates (1291 and 1292). Selecting gate 129 may provide a request signal based on a decoding result from request decoder 128.

HUB request processing unit 130 may receive a request signal and may execute a request process for HUB 19. HID request processing unit 131 may receive a request signal and may execute a request process for HID 3. Virtual port control unit 18 may hold a status of the port to which HID 3 is virtually connected. AND gate 133 may set a request signal to HID request processing unit 131 to an enable state according to virtual port control unit 18.

Figure 3:
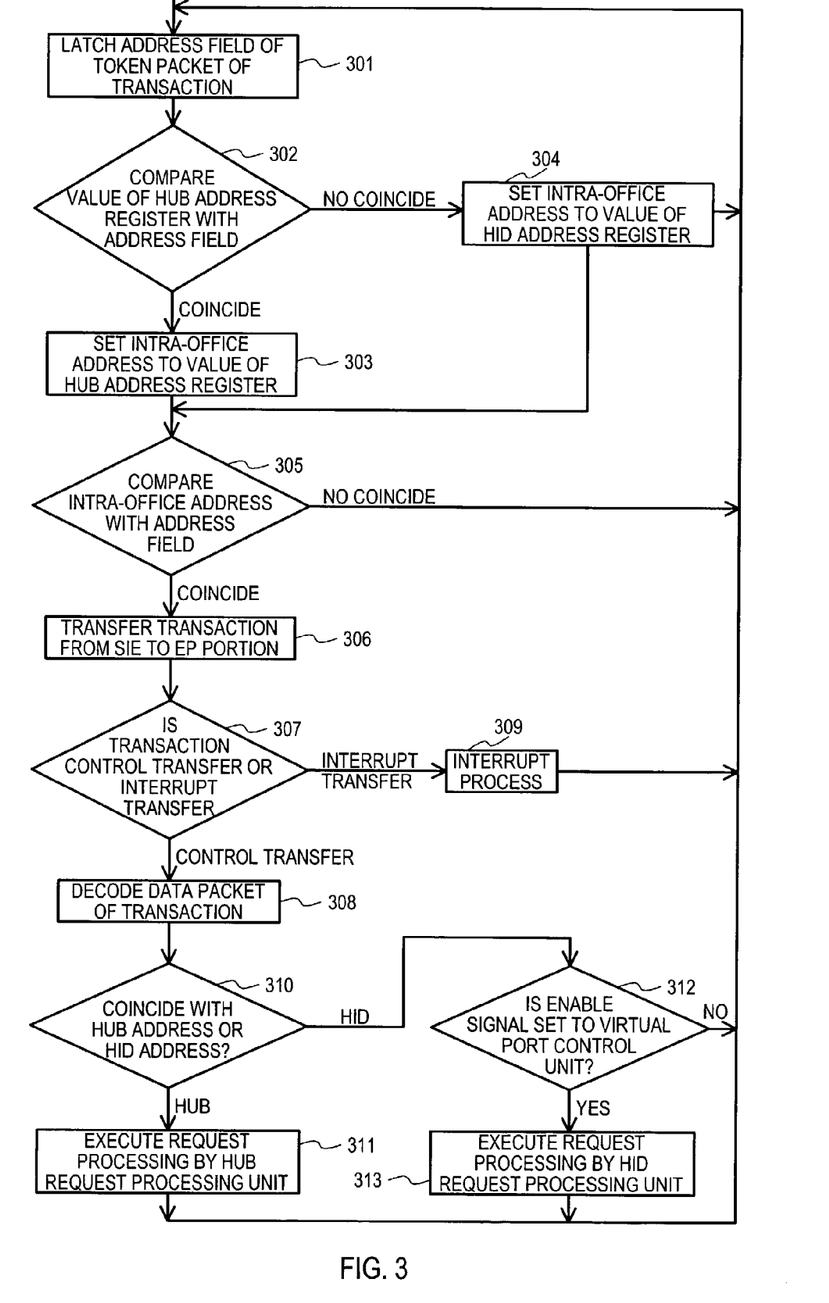
FIG. 3 is a flowchart illustrating the operation of a microcomputer using an USB-HUB device according to an embodiment.

A brief description of the operation of a microcomputer 1 using the USB-HUB device of the embodiment of FIG. 1 will now be given with reference to FIG. 3. FIG. 3 is a flowchart illustrating the operation of a microcomputer 1 using USB-HUB device 19. In the explanation it is assumed that a transaction is provided to up port 13 from host 10.

Referring now to FIG. 3 in conjunction with FIG. 1, a transaction provided to up port 13 may be received via serial/parallel converting unit 121 and an address field in a token packet of such a transaction may be latched in address latch 122 (step 301).

A latched address field may be compared with a value store in HUB address register 124 (step 302). When a latched address field coincides with the value of HUB address register 124, a processing routine may proceed to step 303. When a latched address field does not coincide with the value of HUB address register 124, a processing routine may proceed to step 304.

Thus, when a latched address field coincides with the value of HUB address register 124, the value of HUB address register 124 may be set as an intra-office address (step 303). However, when a latched address field does not coincide with the value of HUB address register 124, a value of HID address register 125 may be set as an intra-office address (step 304).

An intra-office address may be compared with an address field (step 305). When the intra-office address coincides with the address field, the provided transaction may be determined to be executed by HUB device 19 and the processing routine may proceed to step 306. However, if an intra-office address does not coincide with the address field, the provided transaction may be determined to be executed by another device and the processing routine may return to the first step (step 301) without processing for the received transaction.

As noted above, when an intra-office address coincides with the address field, the transaction may be executed by a HUB device, accordingly, the transaction may be transferred to EP portion 12 from SIE 11 (step 306).

In step 307, when a received transaction indicates a control transfer, a processing routine may proceed to step 308. But if a received transaction indicates the interrupt transfer, a process routine may proceed to step 309.

In a control transfer, a data packet of a transaction may be decoded and a request may be specified (step 308). In an interrupt transfer (step 309), a data transfer may be executed in accordance with a token packet of the transaction and a processing routine may return to the step 301.

Referring still to FIG. 3, in step 310, when an address field coincides with a HUB address, a processing routine may proceed to step 311. However if an address field matches with the HID address, a processing routine may proceed to step 312.

According to step 311, when an address field coincides with the HUB address, a HUB request processing unit 130 may execute the request and the processing routine may return to step 301.

According to step 312, when an address field coincides with the HID address, the HID request processing unit 131 may execute the request (step 313) and the processing routine may return to step 301. However, if an address field does not coincide with the HID address, the processing routine may return directly to step 301.

A detailed description will now be given with reference to FIG. 1 of the operation for setting the microcomputer 1 having the USB-HUB device according to the embodiment of FIG. 1.

1. The Setting of the HUB Address

The host computer (host) 10 may be turned on. Then, host 10 may transmit a Set-up transaction as a control transfer (control transfer) to set the HUB address for up port 13 of microcomputer 1 connected to host 10. The control transfer may be a transfer mode used for configuration and initialization of the device, the device interface, and the end point. Incidentally, it is assumed that in such a Set-up transaction, a token packet may include an address field that is set to "00" and a data packet may include a Set-address request and an address setting value of "01." Herein, an address setting value may be a particular identification number that can be allocated to the device.

SIE 11 may receive the Set-up transaction via up port 13. SIE 11 may convert serial data of the Set-up transaction into parallel data thereof by using serial/parallel converting unit 111 and may latch the address field of the token packet in address latch 112. In this case, the Set-up transaction may be simultaneously transmitted to EP portion 12 and the address field may be latched by address latch 122 via serial/parallel converting unit 121.

Comparator 123 in EP portion 12 may compare the value of address latch 122 with a value of HUB address register 124. Because an initial value "00" is stored in HUB address register 124, a coincident signal may be output. Therefore, selector 126 may supply the value of HUB address register 124 to comparator 113 in SIE 11 as the intra-office address. Comparator 113 may compare an intra-office address "00" with an address field "00" which is latched by address latch 112. Because the address field coincides with the intra-office address, comparator 113 may output a coincident signal.

Control block 114 in SIE 11 may receive the coincident signal and transmit the Set-up transaction to control block 127 in EP portion 12. Control block 127 in EP portion 12 may determine whether the received transaction indicates a control transfer or an interrupt transfer. Because the Set-up transaction indicates a control transfer, control block 127 may send the data packet to request decoder 128.

Request decoder 128 may decode the address setting value "01" and a signal indicating the Set-Address request for HUB 19 from the data packet and may output the request signal to the HUB request processing unit 130 via selecting gate 129. HUB request processing unit 130 may receive the request signal and write the address value "01" to HUB address register 124 based on the Set-Address request. The Set_Address requesting process may then end.

2. The Setting of the Port Enable

Next, a host 10 may transmit a transaction that includes a port status request (Get_Status request) as a control transfer. A port status request may be included in a data packet of such a transaction provided to up port 13. A port status request can determine if a device is connected to a port of HUB 19. In such a transaction, a token packet may include an address value of "01" for HUB 19. In response to a portion status request, a HUB 19 may return information (port information) to host 10 via control block 127 in EP portion 12 and control block 114 in SIE 11. Such port information can indicate a port status sent from a port control unit and a virtual port control unit.

For this example, it will be is assumed that port numbers 1, 2, and 3 have been previously allocated to virtual port control unit 18, and port control units (16 and 17), respectively. Further, according to the embodiment of FIG. 1, a device (HID 3) may be connected with a HUB at port number 1 with a "virtual" port by operation of virtual port control unit 18.

In response to a port status request, a HUB 19 may return port information to the host 10 via control block 127 and control block 114. Such port information returned to the host 10 may indicate that the device (HID 3) may not be connected to port numbers 2 and 3.

In response to such port information, a host 10 may send a Set-up transaction as a control transfer to HUB 19. The data packet of such a Set-up transaction may include a port reset request. The port reset request may reset the virtual port control unit 18 having a port number 1. The token packet of the port reset request transaction may include the address "01" of HUB 19.

A host 10 may supply the above-mentioned port reset Set-up transaction to up port 13 so that virtual port control unit 18 may be set to a portable enable status. The address field "01" in a token packet of the supplied transaction may be latched by address latch 122 via serial/parallel converter 121 in EP portion 12. Such an operation can be similar to the above-mentioned setting of the HUB address. Also, the address field "01" may be latched by address latch 122 of SIE 11.

Comparator 123 may compare the address field "01" stored in address latch 122 with the value "01" of HUB address register 124 and may output a coincident signal. Selector 126 may receive the coincident signal from comparator 123 and supply the value of HUB address register 124 as the intra-office address to comparator 113 in SIE 11 based on the coincident signal.

Comparator 113 may compare the address field "01" stored in address latch 112 with the value "01" of HUB address register 124 and may output a coincident signal. Control block 114 in SIE 11 may receive the coincident signal from comparator 113 and send the transaction to control block 127 in EP 12 in response to the coincident signal.

Control block 127 may determine that a received transaction indicates a control transfer and therefore may transmit the packet data to request decoder 128. Request decoder 128 may decode the signal indicating the port reset request for resetting virtual port control unit 18 based on the received data packet. Consequently, request decoder may output a request signal to selecting gate 129.

Because AND gate 1291 in selecting gate 129 is activated by the coincident signal from comparator 123, AND gate 1291 may transmit the request signal to HUB request processing unit 130. However, AND gate 1292 in selecting gate 129 may receive an inverted signal of the coincident signal from comparator 123. As a result, an output from AND gate 1292 may not be activated.

HUB request processing unit 130 may be selected by the request signal and may reset the virtual port control unit 18 based on the port reset request. After that, the port enable may be set to the virtual port control unit 18 and the port reset request may end.

A request intended for HID request processing unit 131 may be accepted by setting the port enable to the virtual port control unit 18. In this way, a route from host 10 to HID 3 may be established.

3. The Address Setting to the Device Connected to the Port

To set an address for the device (HID 3) connected to a HUB 19, a host 10 may provide another Set-up transaction as a control transfer to up port 13. Such a Set-up transaction may include a Set_Address request. Such a Set_Address request can allocate a port address to virtual port control unit 18. Because the Set_Address request may be the address setting request to a new port (to the virtual port control unit 18 according to the embodiment of FIG. 1), a token packet for the transaction may have an address field with "00." Further, a data packet of such a Set-up transaction may include an address setting value of "02".

An address field "00" of the token packet of the supplied Set-up transaction may be latched by address latch 122 via serial/parallel converter 121 in EP portion 12. Such an operation may be similar to the above-mentioned setting of the HUB address. Further, the address field "00" may be latched by address latch 112 in SIE 11.

Comparator 123 may compare the address field "00" stored in address latch 122 with the value "01" of HUB address register 124 and may output a non-coincident signal. Selector 126 may provide the value (initial value "00") of HID address register 125 as the intra-office address to comparator 113 in SIE 11 based on the non-coincident signal of comparator 123.

Comparator 113 may receive the value of HID address register 125 as the intra-office address. Comparator 113 may compare the address field "00" stored in address latch 112 with the intra-office address "00" and may output a coincident signal. Control block 114 in SIE 11 may receive the coincident signal and may send the transaction to control block 127 in EP 12 in response to the coincident signal.

Because the received transaction indicates a control transfer, control block 127 may send the data packet to request decoder 128. Request decoder 128 may decode received data packet values that indicate a Set_address request with an address setting value "02," and may provide a request signal. In this case, because AND gate 1292 may be activated by the non-coincident signal from comparator 123, selecting gate 129 may transmit the request signal to AND gate 133. Still further, because AND gate 133 may be activated by the enable signal from virtual port control unit 18, a request signal may be transmitted to HID request processing unit 131.

HID request processing unit 131 may receive the request signal and write a setting value "02" to HID address register 125 based on the request of the Set_address request. A Set_address request may then end.

The above example has described a case in which no device is connected to port control units (16 and 17). However, in a case where a device is connected to a port control units 16 and/or 17, a host 10 may supply a port enable request and Set_Address request of the device connected to port control units (16 and 17) to up port 13. Such operations may set addresses for devices connected to the respective ports.

4. Interrupt Transfer to the HID (Interrupt Transfer)

Next, a description is given of the operation when host 10 executes an interrupt transfer to the HID 3.

A host 10 may provide an IN transaction or an OUT transaction to up port 13 to thereby perform an interrupt transfer (interrupt transfer to HID 3). In an IN transaction or an OUT transaction, a token packet of the transaction may include the address value (currently, "02") of HID 3 in the address field. Herein, an interrupt transfer may be a transfer mode in which data may be conveyed from the device (HID device 3) to host 10. According to the embodiment of FIG. 1, it is assumed that the IN transaction indicates that the data of HID 3 written to buffer 33 may be read by host 10.

HUB 19 may receive the IN transaction for HID 3 via up port 13. When receiving the IN transaction, address latch 122 in EP 12 may store the address field "02" of the token packet via serial/parallel converter 121. Similarly, address latch 112 in SIE 11 may store the address field "02" via serial/parallel converter 111.

Address latch 121 may latch the address field. Then, comparator 123 may compare the address field "02" with the value "01" of HUB address register 124 and may provide a non-coincident signal. As a result, selector 126 may supply the value "02" of HID address register 126 as the intra-office address to comparator 113 in SIE 11. Comparator 113 may compare the address field "02" stored in address latch 112 in SIE 11 with the intra-office address "02" and may provide a coincident signal. Control block 114 may send the transaction to control block 127 in response to the received coincident signal.

Control block 127 may determine that the received transaction indicates an interrupt transfer and the data may be transferred to host 10 from HID 3. Therefore, control block 127 may read the data from buffer 33, and may output such data to up port 13 via control block 114. In this way, the data may be sent to the host 10. Such an IN transaction may then end. Herein, a control block 114 may perform the operation for converting the parallel data read from buffer 33 into the serial data for transfer to a host 10.

As mentioned above, EP portion 12 may include serial/parallel converter 121, address latch 122, comparator 123, HID address register 125, selecting gate 129, HID request processing unit 131, and AND gate 133. Such an arrangement can allow for SIE 11 to be used as a serial interface engine of HID 3. This is in contrast to conventional approaches that could include separate serial interface engines for a device (e.g., HID) and a HUB.

Figure 5:
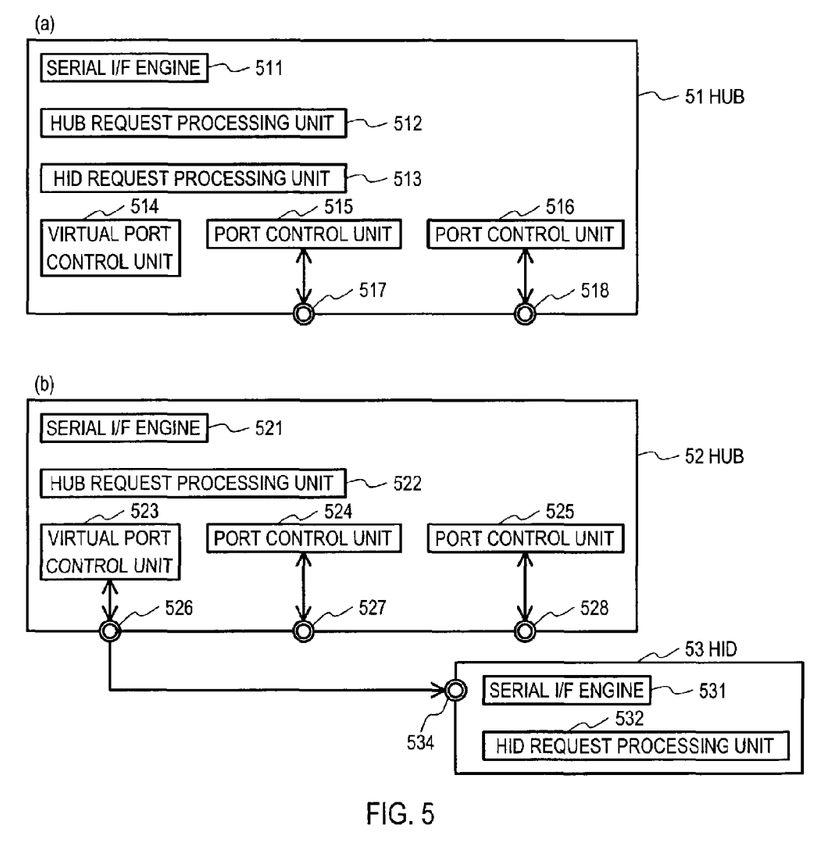
FIG. 5(a) is a block schematic diagram of the physical structure of a HUB according to an embodiment.
FIG. 5(b) is a block schematic diagram of the logical structure of a HUB and a HID in view of the host according to an embodiment.

Referring now to FIG. 5(a), a block schematic diagram of the physical structure of a HUB according to an embodiment is set forth and given the general reference character 51.

A HUB 51 may include a serial interface engine 511, a HUB request processing unit via serial/parallel converter 121. Similarly, address latch 112 in SIE 11 may store the address field "02" via serial/parallel converter 111.

Address latch 121 may latch the address field. Then, comparator 123 may compare the address field "02" with the value "01" of HUB address register 124 and may provide a non-coincident signal. As a result, selector 126 may supply the value "02" of HID address register 126 as the intra-office address to comparator 113 in SIE 11. Comparator 113 may compare the address field "02" stored in address latch 112 in SIE 11 with the intra-office address "02" and may provide a coincident signal. Control block 114 may send the transaction to control block 127 in response to the received coincident signal.

Control block 127 may determine that the received transaction indicates an interrupt transfer and the data may be transferred to host 10 from HID 3. Therefore, control block 127 may read the data from buffer 33, and may output such data to up port 13 via control block 114. In this way, the data may be sent to the host 10. Such an IN transaction may then end. Herein, a control block 114 may perform the operation for converting the parallel data read from buffer 33 into the serial data for transfer to a host 10.

As mentioned above, EP portion 12 may include serial/parallel converter 121, address latch 122, comparator 123, HID address register 125, selecting gate 129, HID request processing unit 131, and AND gate 133. Such an arrangement can allow for SIE 11 to be used as a serial interface engine of HID 3. This is in contrast to conventional approaches that could include separate serial interface engines for a device (e.g., HID) and a HUB.

Referring now to FIG. 5(a), a block schematic diagram of the physical structure of a HUB according to an embodiment is set forth and given the general reference character 51.

A HUB 51 may include a serial interface engine 511, a HUB request processing unit 512, an HID request processing unit 513, a virtual port control unit 514, port control units (515 and 516) and ports (517 and 518). Port control unit 515 may be connected to port 517. Port control unit 516 may be connected to port 518.

Referring now to FIG. 5(b), a block schematic diagram of the logical structure of a HUB 52 and a HID 53 in view of the host according to an embodiment is set forth.

HID 53 may include a serial interface engine 531 and a HID request processing unit 532. HID 53 may be connected to HUB 52 via an up port 534 connected to a down port 526 of HUB 52. HUB 52 may include a serial interface engine 521, a HUB request processing unit 522, a virtual port control unit 523, port control units (524 and 525) and ports (526 to 528). Port control unit 524 may be connected to port 527. Port control unit 525 may be connected to port 528. Virtual port control unit 523 may be connected to port 526. To form the above-mentioned logical structure, a virtual port control unit 514 may be used in HUB 51.

Another embodiment of the present invention will now be described with reference to FIG. 2.

Figure 2:
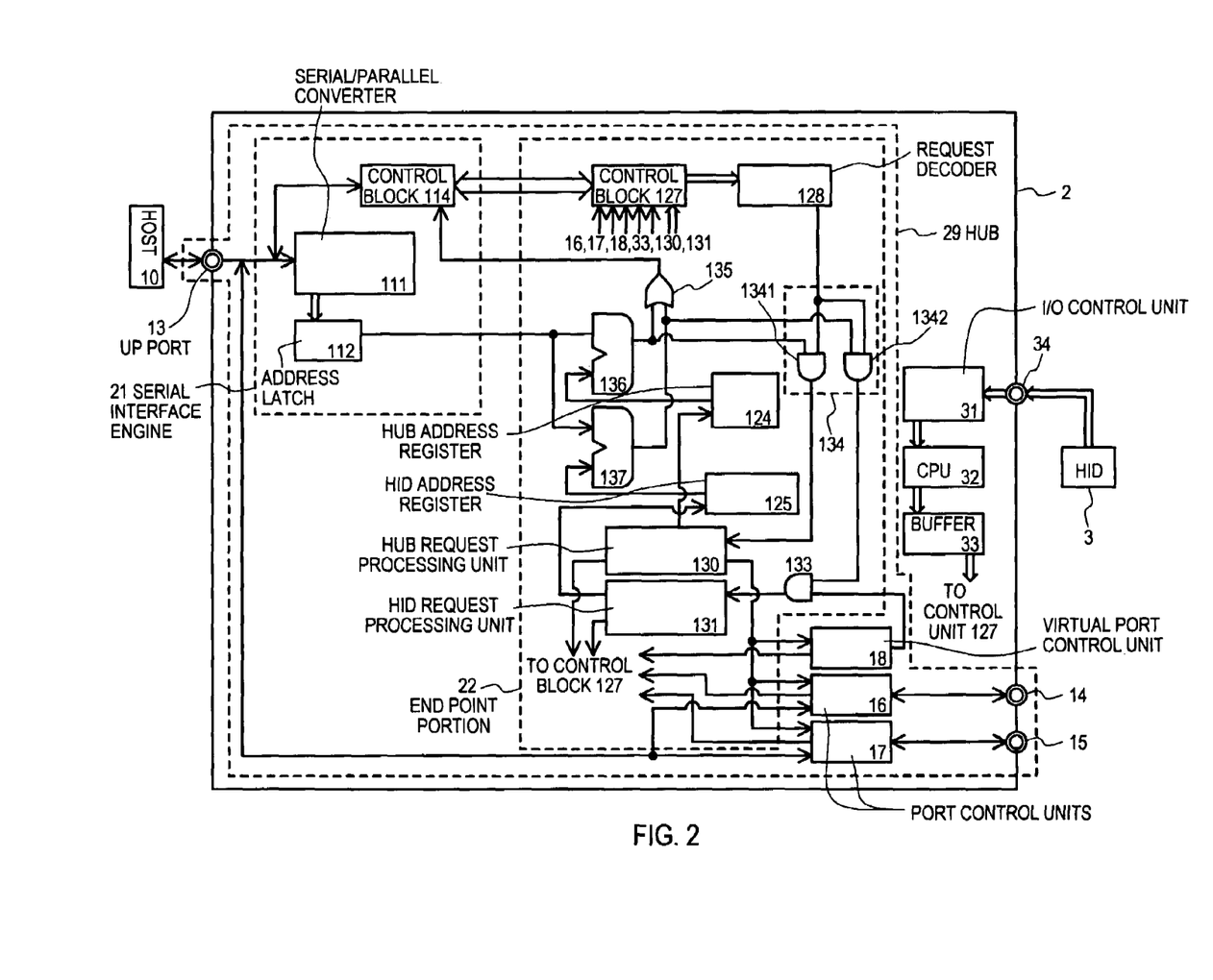
FIG. 2 is a block schematic diagram of a microcomputer, a host, and a HID according to an embodiment.

As in the case of FIG. 1, in the particular embodiment of FIG. 2, it is assumed that a USB-HUB may be realized in a chip of a microcomputer provided in a keyboard, as just one example.

Referring now to FIG. 2, a block schematic diagram of a microcomputer 2, a host 10, and a HID 3 according to an embodiment is set forth. FIG. 2 may include similar constituents as the embodiment of FIG. 1. Such constituents may be referred to by the same reference character.

Microcomputer 2 of FIG. 2 may include similar constituents as microcomputer 1 of FIG. 1 and such constituents may be referred to by the same reference character.

A microcomputer 2 may include a HUB 29, an external terminal 34, an I/O control unit 31, a CPU 32, and a buffer 33. Data from HID 3 may be provided to external terminal 34. CPU 32 may be connected to I/O control unit 31. Buffer 33 may be connected to CPU 32. It is assumed here that CPU 32 may receive data from an HID 3 via external terminal 34 and I/O control unit 31 and may periodically write the data to buffer 33.

HUB 29 may include similar constituents as HUB 19 of FIG. 1, and such similar constituents may be referred to by the same reference character. HUB 29 may include an up port 13, a serial interface engine (SIE) 21, an end point (EP) portion 22, port control units (16 and 17), a virtual port control unit 18, and down ports (14 and 15). Up port 13 may provide a connection of HUB 19 to host 10. Down ports (14 and 15) may be provided corresponding to port control units for being connected to the device.

A description of the transaction output by host 10 has been given with reference to the embodiment of FIG. 1 and is therefore omitted here.

SIE 21 may include similar constituents as SIE 11 of FIG. 1, and such constituents may be referred to by the same reference character. SIE 21 may include a serial/parallel converting unit 111, an address latch 112, and a control block 114. Serial/parallel converting unit 111 may be connected to up port 13 and may convert the received transaction to parallel data. Address latch 112 may latch the address field of the token packet provided from serial/parallel converting unit 111. Control block 114 may be connected to up port 13 and may control the transfer of the transaction. A control block 114 may be controlled according to a control signal provided by EP portion 22.

EP portion 22 may include similar constituents as EP portion 12 of FIG. 1, and such constituents may be referred to by the same reference character. EP portion 22 may include comparators (136 and 137), a HUB address register 124, a HID address register 125, a control block 127, a request decoder 128, a selecting gate 134, a HUB request processing unit 130, a HID request processing unit 131, an AND gate 133, and OR gate 135. Comparator 136 may compare a value of address latch 112 with a HUB address stored in HUB address register 124. Comparator 137 may compare a value of address latch 112 with a HID address stored in HID address register 125. OR gate 135 may provide a logical OR of outputs of comparators (136 and 137) as a control signal.

Control block 127 may transmit the data packet of the transaction to a request decoder when the transaction supplied from control block 114 indicates a control transfer. Request decoder 128 may decode a data packet provided from control block 127 and provide the request signal. Selecting gate 134 may include AND gates (1341 and 1342), which may provide a request signal based on the outputs of comparators (136 and 137) and the decoding result of request decoder 128.

HUB request processing unit 130 may receive a request signal and may execute a HUB request process. HID request processing unit 131 may receive the request signal and may execute a HID request process. Virtual port control unit 18 may hold a status of a port to which HID 3 is virtually connected. AND gate 133 may set the request signal to HID request processing unit 131 to an enable state according to virtual port control unit 18.

Figure 4:
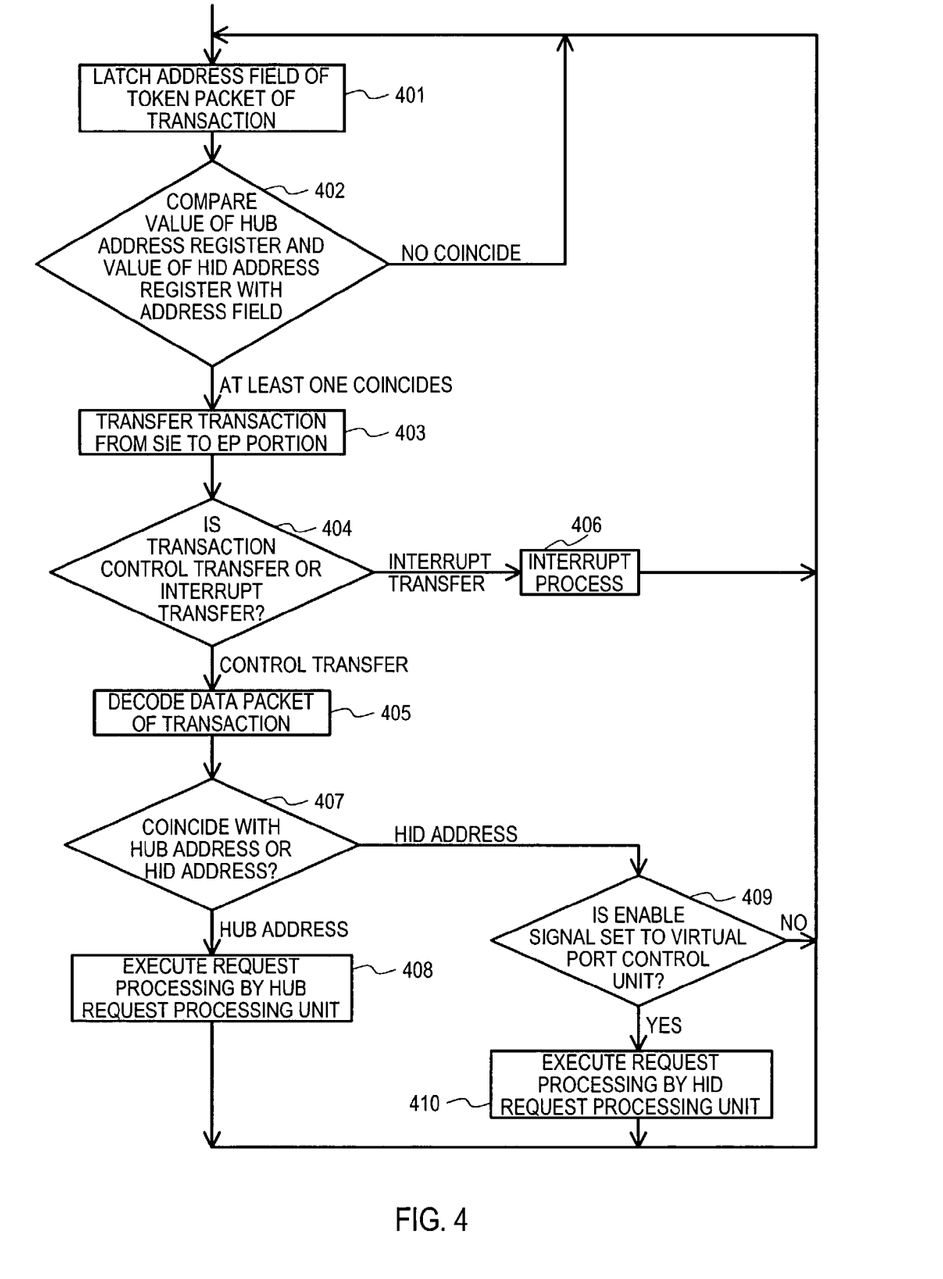
FIG. 4 is a flowchart illustrating the operation of a microcomputer using an USB-HUB device according to an embodiment.

A brief description of the operation of a microcomputer 2 using the USB-HUB device of the embodiment of FIG. 2 will now be given with reference to a flowchart of FIG. 4. FIG. 4 is a flowchart illustrating the operation of a microcomputer 2 using USB-HUB device 29. In the explanation it is assumed that a transaction is provided to up port 13 from host 10.

Referring now to FIG. 4 in conjunction with FIG. 2, a transaction provided to up port 13 may be received via serial/parallel converting unit 111 and the address field in the token packet may be latched in address latch 112 (step 401).

A latched address field may be compared with the value of HUB address register 124 and also with the value of HID address register 125 (step 402). When the latched address field coincides with the value of HUB address register 124 or coincides with the value of HID address register 125, a processing routine may proceed to step 403. However, when a latched address field does not coincide with either the value of HUB address register 124 or the value of HID address register 125, the processing routine may return to an initial state. When a latched address field coincides with the value of HUB address register 124 or the value of HID address register 125, SIE 21 may transfer the transaction to EP portion 22 (step 403).

In step 404, a determination may be made as to whether the transaction indicates a control transfer or an interrupt transfer. If the transaction indicates a control transfer, the processing routine may proceed to step 405. If the transaction indicates an interrupt transfer, the process may proceed to step 406.

For a control transfer, a data packet of the transaction may be decoded and the type of request may be specified (step 405). For an interrupt transfer, the data transfer may be executed in accordance with information provided by the token packet and the processing routine may return to the initial state (step 406).

In step 407, a determination may be made whether the address field coincides with the value of HUB address register 124 or the value of HID address register 125. If the address field coincides with the value of HUB address register 124, the processing routine may proceed to step 408. If the address field coincides with the value of HID address register 125, the processing routine may proceed to step 409.

If the address field coincides with the value of HUB address register 124, the request may be executed by HUB request processing unit 130 (step 408) and the processing routine may return to the initial state. If the address field coincides with the value of HID address register 125, a determination may be made as to whether virtual port control unit 18 has set an enable signal (step 409). If virtual port control unit 18 has set an enable signal, the process routine may proceed to step 410. If virtual port control unit 18 has not set an enable signal, the process routine may return to the initial state. In step 410, the request may be executed by HID request processing unit 131 and the processing routine may then return to the initial state.

A detailed description will now be given with reference to FIG. 2 of the operation for setting the microcomputer 2 having the USB-HUB device according to the embodiment of FIG. 2.

1. The Setting of the HUB Address

The host computer (host) 10 may be turned on. Then, host 10 may transmit a Set-up transaction as a control transfer to microcomputer 2 connected to host 10. Incidentally, it is assumed that the address field of the token packet in the Set-up transaction may be set to "00" and a Set_Address request and an address setting value of "01" may be included in the data packet of the Set-up transaction. The address setting value may be a particular identification number that is allocated to the device.

SIE 21 may receive the Set_Address request via up port 13. SIE 21 may convert serial data of the Set-up transaction into parallel data thereof by using serial parallel converting unit 111 and may latch the address field of the token packet by address latch 112.

Address latch 112 may latch the address field. Then, comparator 136 in EP portion 22 may compare the value of address latch 112 with a value of HUB address register 124. Because an initial value "00" is stored in HUB address register 124, comparator 136 may output a coincidental signal. Similarly, comparator 137 in EP portion 22 may compare the value of address latch 112 with a value of HID address register 125. Because an initial value "00" is stored in HID address register 125, comparator 137 may also output a coincidental signal. In this way, OR gate 135 may provide a coincident signal to control block 114 in response to coincident signals provided by comparators (136 and 137).

Control block 114 in SIE 21 may receive the coincident signal and transmit the Set-up transaction to control block 127 in EP portion 12. Control block 127 in EP portion 12 may determine whether the received transaction indicates a control transfer or an interrupt transfer. Because the Set-up transaction indicates a control transfer, control block 127 may send the data packet to request decoder 128. Request decoder 128 may decode the data packet of the transaction to determine the address setting value of "01" and Set_Address request indication for HUB 29. Request decoder 128 may output a request signal to selecting gate 134.

Selecting gate 134 may include AND gates (1341 and 1342). AND gate 1341 may receive the coincident signal from comparator 136 and the request signal from request decoder 128. AND gate 1342 may receive the coincident signal from comparator 137 and the request signal from request decoder 128. Because both comparators (136 and 137) provide a coincident signal upon setting the HUB address, AND gates (1341 and 1342) both provide active signals (logic high in this case) as an output.

HUB request processing unit 130 may receive the active signal from AND gate 1341. AND gate 133 may receive the active signal from AND gate 1342. Herein, a control signal may be provided to an input terminal of AND gate 133 from virtual port control unit 18. The initial value of the control signal may indicate disable (logic low in this case) and thus, AND gate 133 may not be enabled.

As a result, the request signal from selecting gate 134 may be provided only to HUB request processing unit 130. HUB request processing unit 130 may perform the processing in response to the request signal. In this way, HUB request processing unit 130 may set the address value "01" to HUB address register 124 based on the decoded Set_Address request and the Set_Address requesting process may end.

2. The Setting of the Port Enable

Next, the host 10 may transmit a transaction as a control transfer including a port status request (Get_Status request) in the data packet to up port 13. In this way, a check to determine if a device is connected to the port of HUB 29 may be performed. A token packet of the transaction may include an address "01" for HUB 29. In response to such a request, HUB 29 may return information (port information) to host 10 via control block 127 in EP portion 22 and control block 114 in SIE 21. Such port information may indicate a port status sent from the port control unit and virtual port control unit.

Herein, it is assumed that port numbers 1, 2, and 3 have been previously allocated to virtual control unit 18 and the port control units (16 and 17), respectively.

According to the embodiment of FIG. 2, the device (HID 3) may be connected to port number 1 indicating a virtual port from virtual port control unit 18. A HUB 29 may return port information to the host 10 via control block 127 and control block 114. The port information returned to the host 10 may indicate that the device (HID 3) may not be connected to port numbers 2 and 3.

In response to port information generated by a port status request, a host 10 may send a Set-up transaction as a control transfer to HUB 29. A data packet of such a Set-up transaction may include a port reset request. The port reset request may reset the virtual port control unit 18 as port number 1. A token packet of such a transaction includes an address of "01" for HUB 29.

A host 10 may supply the above-mentioned transaction to up port 13 so that virtual port control unit 18 may be set to be in a port enable status. The address field "01" in the token packet of the supplied transaction may be latched by address latch 112 via serial/parallel converter 111 in SIE 21 similarly to the above-mentioned setting of the HUB address.

Address latch 112 may latch the address field. Then, comparator 136 may compare the address field "01" stored in address latch 112 with the value "01" of HUB address register 124 and may output a coincident signal. Comparator 137 may compare the address field "01" stored in address latch 112 with the initial value "00" of HID address register 125 and may output a non-coincident signal.

OR gate 135 may receive the coincident signal from comparator 136 and the non-coincident signal from comparator 137 and may provide the coincident signal from comparator 136 to control block 114. Control block 114 may receive the coincident signal and may send the Set-up transaction to control block 127. Because the received transaction indicates a control transfer, control block 127 may send the data packet to request decoder 128.

Request decoder 128 may decode the signal indicating the port reset request for resetting the virtual port control unit 18 based on the received data packet and may output the request signal to selecting gate 134. Selecting gate 134 may receive the request signal. Because AND gate 1341 receives a coincident signal from comparator 136, AND gate 1341 may transmit the request signal to HUB request processing unit 130.

HUB request processing unit 130 may be selected by the request signal and may reset the virtual port control unit 18 based on the port reset request. After that, the port enable may be set to the virtual port control unit 18 and the port reset request may end.

Request for a HID request processing unit 131 may be accepted by setting the port enable to the virtual port control unit 18. In this way, a route from host 10 to HID 3 may be established.

3. The Address Setting to the Device Connected to the Port

A host 10 may provide a Set-up transaction that includes the Set_Address request as a control transfer to up port 13. Such a request can to assign a port address for virtual port control unit 18. A Set_Address request may be a request for setting an address to a new port (to the virtual port control unit 18 according to the embodiment of FIG. 1). Therefore, such a Set-up transaction may include a token packet having a value "00 set in the address field and a data packet having a Set_Address request data field and an address setting value of "02."

Similarly to the above-mentioned setting of the HUB address, the address field "00" of the token packet of the supplied Set-up transaction may be latched by address latch 112 via serial/parallel converter 111 in SIE 21.

Comparator 136 in EP portion 22 may compare the value "00" of address latch 112 with a value "01" of HUB address register 124. Because there is no match, comparator 136 may output a non-coincident signal. Comparator 137 in EP portion 22 may compare the value "00" of address latch 112 with a value "00" of HID address register 125. Because comparator 137 determines a match has occurred, comparator 137 may output a coincident signal.

OR gate 135 may receive the coincident signal from comparator 137 and the non-coincident signal from comparator 136 and may provide the coincident signal from comparator 137 to control block 114.

Control block 114 may receive the coincident signal and may send the Set-up transaction to control block 127. Because the received transaction indicates a control transfer, control block 127 may send the data packet to request decoder 128.

Request decoder 128 may decode the address setting value "02" and the Set_Address request for HID request processing unit 131 from the received data packet and may output a request signal to selecting gate 134. Because AND gate 1342 receives a coincident signal from comparator 137, AND gate 1342 may transmit the request signal to AND gate 133.

AND gate 133 may be activated (enabled) by virtual port control unit 18. In this way, AND gate 133 may provide the request signal to HID request processing unit 131.

HID request processing unit 131 may receive the request signal and may set a value "02" to HID address register 125 based on the request of the decoded Set_address request. A Set_address request may then end.

The above example has illustrated a case in which no device is connected to port control units (16 and 17). However, in a case where a device is connected to port control unit 16 and/or 17, a host 10 may supply a port enable request and Set_Address request of the device connected to such a port control unit (16 and 17) to up port 13. Such operations may set the address of the device connected to the respective port control units (16 and 17).

4. Interrupt Transfer to the HID (Interrupt Transfer)

Next, an operation of a host 10 executing an interrupt transfer to the HID 3 will be described.

Host 10 may provide an IN transaction or an OUT transaction to up port 13 to perform an interrupt transfer (interrupt transfer to HID 3). In an IN transaction or an OUT transaction, a token packet may include the address value (currently, "02") of HID 3 in the address field.

Herein, an interrupt transfer may be a transfer mode in which the data may be conveyed from the device (HID device 3) to host 10. According to the embodiment of FIG. 1, it is assumed that the IN transaction indicates that the data of HID 3 written to buffer 33 may be read by host 10.

HUB 29 may receive the IN transaction for HID 3 via up port 13. When receiving the IN transaction, address latch 112 in SIE 21 may store the address field "02" of the token packet via serial/parallel converter 111.

Address latch 112 may latch the address field of the token packet. Then, comparator 136 may compare the address field "02" with the value "01" of HUB address register 124 and may provide a non-coincident signal. Comparator 137 may compare the address field "02" with the value "02" of HID address register 125 and may provide a coincident signal.

OR gate 135 may receive the coincident signal from comparator 137 and the non-coincident signal from comparator 136 and may provide the coincident signal from comparator 137 to control block 114.

Control block 114 may receive the coincident signal and may send the IN transaction to control block 127. Because the received transaction indicates an interrupt transfer, it is understood that data is to be transferred to host 10 from HID 3. Consequently, control block 127 may read data from buffer 33, which stores the data of HID 3. Further, control block 127 may output the read data to up port 13 via control block 114 and may send the data to host 10. An IN transaction may then end.

As mentioned above, EP portion 22 may include HUB address register 124, HID address register 125, HID request processing unit 131, AND gate 133, selecting gate 134, OR gate 135, and comparators (136 and 137). Due to such an arrangement, a SIE 11 provided for HUB 29 may be used as a serial interface engine of HID 3.

According to the embodiment of FIG. 2, a circuit structure may be simpler than the circuit structure of FIG. 1, as EP portion 22 may not include a serial/parallel converter.

Further, according to the embodiment of FIG. 2, because the comparison between a HUB address and the address field and a comparison between the HID address and the address field may be performed essentially simultaneously, a response speed may be improved as compared to the embodiment of FIG. 1.

It is also understood that while FIG. 2 has shown examples of a microcomputers connected to a single device (e.g., HID) by way of a virtual port control unit, alternate arrangements may include a plurality of devices (e.g., HIDs), a plurality of HID request processing units, and a plurality of virtual port control units. In such an alternate arrangement, a selecting gate 134 may be changed so that a single request processing unit can be selected. Further, an AND gate (like AND gate 133) may be provided for each HID processing unit. In this way, a configuration using a plurality of HIDs may be realized.

Similarly, according to the particular embodiment of FIG. 1, a single device (e.g., HID) may be connected. However, a SIE may be shared by a plurality of devices. To realize the sharing of a SIE by a plurality of devices, an arrangement like that of FIG. 1 may be modified to providing a plurality of HID request processing units, virtual port units, HID address registers, and comparators. Further, a single processing unit via a modified selecting gate (like selecting gate 129) and additional AND gates (like AND gate 133).

Further, according to the embodiment of FIG. 2, the apparatus may be modified by providing a plurality of HID request processing units, virtual control port units, HID address registers, and comparators and by selecting a single processing unit in selecting gate 134. In this way, a SIE may be shared by a plurality of devices.

Incidentally, according to the embodiments, request decoder 128 has a single output terminal for the sake of a brief description. However, request decoder 128 may have many output terminals providing a plurality of signals in accordance with a request. In such a case, the number of input terminals of HUB request processing unit 130 and HID request processing unit 131 may be increased to receive signals in accordance with a request. Furthermore, the number of AND gates forming a selecting gate (129 and 134) may be increased accordingly, in order to provide such additional signals.

According to the embodiments, a USB-HUB device can be provided in a microcomputer chip. However, it is understood that a HUB function may be performed by another chip.

Further, according to the embodiments, a HID may be a device connected to a virtual port. However, such a particular type of device should not be construed as limiting to the invention. Various other devices accessible according to an address may also be included.

Still further, while the embodiments have described examples of control transfers and interrupt transfers, another transfer modes may also be applied.

As has been described above, a virtual control unit may be provided in a HUB. In this away, a HUB may enter a temporary state in which a HID request processing unit is logically connected to a HUB up port. Therefore, a HUB serial interface engine may be used when a request for the HID is received. In this way, the circuit scale may be reduce and manufacturing costs may be reduced.

It is understood that the embodiments described above are exemplary and the present invention should not be limited to those embodiments. Specific structures should not be limited to the described embodiments.

Thus, while the various particular embodiments set forth herein have been described in detail, the present invention could be subject to various changes, substitutions, and alterations without departing from the spirit and scope of the invention. Accordingly, the present invention is intended to be limited only as defined by the appended claims.

What is claimed is:

1. A Universal Serial Bus (USB)-HUB device having at least one up port and at least one down port, comprising:
    a serial interface engine which transfers a transaction provided to the up port in response to a control signal;
    an end point portion which compares a HUB address with an address field of a token packet of the transaction and compares a first device address with the address field of the token packet, the end point portion providing the control signal and receiving the transaction from the serial interface engine when the address field coincides with either the HUB address or the first device address;
    a port control unit for connecting an external device to the at least one up port via the at least one down port; and a virtual port control unit that connects the first device having the first device address to the at least one up port via a data path that does not include any of the at least one down port.

2. The USB-HUB device according to claim 1, further including:
a HUB request processing unit which performs predetermined HUB functions of the USB-HUB device in accordance with at least one HUB request signal; and
a control block that generates the at least one HUB request signal when the transaction indicates a control transfer of a HUB device function.

3. The USB-HUB device according to claim 1, further including:
a device request processing unit that executes predetermined device operations in response to the virtual port control unit and at least a portion of a data packet of the transaction.

4. The USB-HUB device according to claim 1, further including:
a HUB address register which stores a HUB address for HUB functions of the HUB device; and
a device address register which stores the first device address of the first device, where the first device is not connected via the at least one down port.

5. The USB-HUB device according to claim 4, further including:
a HUB request processing unit that sets the HUB address of the HUB address register to a set address value when a data packet of the transaction includes an address setting request for the USB-HUB device; and
a device request processing unit that sets the first device address of the device address register when the data packet of the transaction includes an address setting request for the first device.

6. A Universal Serial Bus (USB)-HUB device, comprising:
a serial interface engine that receives a transaction from a host computer coupled to an up port and transfers the transaction in response to a control signal;
at least one down port;
a port control unit provided for each down port;
a virtual port control unit provided for a first device that is connected to the USB-HUB device, but not via the at least one down port;
a HUB address register which stores a HUB address;
a device address register which stores a first device address for the first device;
at least one comparator which compares the HUB address and the first device address with an address field of a token packet of the transaction and providing the control signal if the HUB address or the first device address matches the address field;
a HUB request processing unit for setting the HUB address register, the port control unit, or the virtual port control unit in response to a first request signal;
a device request processing unit which sets the device address register in response to a second request signal; and
a control block which receives the transaction transferred from the serial interface engine, and transfers a data packet of the transaction when the transaction indicates a control transfer and transfers data in accordance with the token packet of the transaction when the transaction indicates an interrupt transfer.

7. The USB-HUB device according to claim 6, wherein:
the comparator providing at least one coincident signal if the HUB address or the first device address matches the address field and the control signal is provided in response to the coincident signal.

8. The USB-HUB device according to claim 6, wherein:
the comparator includes a first comparator and a second comparator;
the first comparator is coupled to receive the HUB address from the HUB address register and the address field and provides a first coincident signal if the HUB address matches the address field;
the second comparator is coupled to receive the first device address from the device address register and the address field and provides a second coincident signal if the first device address matches the address field; and
the control signal is provided in response to the first coincident signal or the second coincident signal.

9. The USB-HUB device according to claim 6, wherein:
the serial interface engine includes a second control block coupled to receive the control signal and the transaction from the host computer and transfer the transaction in response to the control signal.

10. The USB-HUB device according to claim 9, wherein:
the serial interface engine further includes
a serial/parallel converting unit coupled to serially receive at least a portion of the transaction from the host computer and provide parallel data as the address field.

11. The USB-HUB device according to claim 10, wherein:
the serial interface engine further includes
an address latch coupled to receive and latch the address field provided from the serial/parallel converting unit.

12. A control method of a Universal Serial Bus (USB)-HUB device, comprising the steps of:
latching an address field of a token packet of a transaction provided from a host;
comparing a value of a HUB address register with the address field;
setting an intra-office address to a value of the HUB address register when the step of comparing the value of the HUB address register with the address field determines a coincidence;
setting the intra-office address to a value of a first device address when the step of comparing a value of a HUB address register determines a non-coincidence;
comparing the intra-office address with the address field;
determining whether the transaction indicates a first transfer type or a second transfer type when the step of comparing the intra-office address with the address field determines a coincidence;
transferring a data packet of the transaction when the first transfer is indicated; and
executing a process based on the transaction when the second transfer type is indicated.

13. The control method of a USB-HUB device according to claim 12, further including the steps of:
decoding a request from the transferred data packet;
performing a process of a HUB request when the value of the HUB address register coincides with the address field; and
performing a process of a device request when the value of a first device address register coincides with the address field and an enable signal is set by a virtual port control unit.

14. The control method of a USB-HUB device according to claim 13, wherein:
the step of setting the intra-office address to the value of the first device address includes providing the intra-office address as the first device address through a selection circuit.

15. The control method of a USB-HUB device according to claim 14, wherein:
the step of setting the intra-office address to the value of the HUB address includes providing the intra-office address as the HUB address through the selection circuit.

16. A control method of a Universal Serial Bus (USB)-HUB device, comprising the steps of:
latching an address field of a token packet of a transaction provided from a host;
comparing a value of a HUB address register and a first device address register with the address field;
determining whether the transaction indicates a first transfer type or a second transfer type when the step of comparing the value of the HUB address register with the address field determines a coincidence or comparing the value of the first device address register with the address field determines a coincidence;
transferring a data packet of the transaction when the first transfer type is determined; and
executing a process based on the transaction when the second transfer type is determined.

17. The control method of a USB-HUB device according to claim 16, further including the steps of:
decoding a request from the transferred data packet;
performing a process of a HUB request when the value of the HUB address register coincides with the address field; and
performing a process of a device request when the value of the first device address register coincides with the address field and an enable signal is set by a virtual port control unit.

18. A control method of a Universal Serial Bus (USB)-HUB device including an up port connected to a host, a port control unit for connecting a first device via a down port, and a virtual port control unit for connecting the first device via a connection that is not a down port, the control method comprising the steps of:
setting a HUB address by a control transfer type first transaction provided from the host;
setting an enable signal to the virtual port by a control transfer type second transaction provided from the host;
setting a first device address in the USB-HUB device by a control transfer type third transaction provided from the host and an enable signal from the virtual port control unit; and
reading information from or writing information to the device specified by the first device address by an interrupt-type transfer provided from the host.

19. The control method according to claim 18, wherein:
the step of reading information from or writing information to the first device includes
comparing an address value included with a token packet of the interrupt-type transfer with a value stored in a HUB address register; and
comparing the address value included with the token packet with a value stored in a first device address register.

* * * * *